(12) United States Patent
Bae (10) Patent No.: US 6,561,943 B1
(45) Date of Patent: May 13, 2003

(54) CLUTCH APPARATUS FOR AUTOMATIC TRANSMISSION

(76) Inventor: Myung-soon Bae, 101-1504 Daeback Apt., 540 Okkye-dong, Gumi-shi, Kyungsangbuk-do 730-380 (KR)

( * ) Notice: Subject to any disclaimer, the term of this patent is extended or adjusted under 35 U.S.C. 154(b) by 0 days.

(21) Appl. No.: 09/980,115

(22) PCT Filed: May 23, 2000

(86) PCT No.: PCT/KR00/00517

§ 371 (c)(1),
(2), (4) Date: Nov. 28, 2001

(87) PCT Pub. No.: WO00/73675

PCT Pub. Date: Dec. 7, 2000

(30) Foreign Application Priority Data

May 28, 1999 (KR) .......................................... 99-19340

(51) Int. Cl.[7] .............................. F16H 3/44; F16D 21/04
(52) U.S. Cl. ........................ 475/320; 475/269; 192/20
(58) Field of Search .................... 192/20, 220; 475/269, 475/317, 320, 321, 322

(56) References Cited

U.S. PATENT DOCUMENTS 4,299,141 A * 11/1981 Fairchild ................ 475/322 X
5,687,824 A   11/1997 Hara et al
5,733,217 A    3/1998 Naraki et al.
5,846,153 A * 12/1998 Matsuoka .................... 475/269

* cited by examiner

Primary Examiner—Sherry Estremsky
Assistant Examiner—Roger Pang
(74) Attorney, Agent, or Firm—Knobbe, Martens, Olson & Bear, LLP (57) ABSTRACT

A clutch apparatus including a clutch base having a supporting boss which has first spline grooves, a clutch cover, an output shaft having a sun gear, rotating bearings fitted around the output shaft such that the output shaft can be rotated in one direction and not in the other, planetary gear sections each possessing a guide shaft and a planetary gear which is meshed with the sun gear, a rotating member having a ring gear which is meshed with planetary gears and third spline grooves, a multiple disc clutch member having inner plates which are splined into the rotating member and outer plates which are splined into the supporting boss, a pressing plate letting the inner and outer plates to be tightly engages with one another, pressing means for applying pressing force to the pressing plate, and pressing force adjusting means.

7 Claims, 9 Drawing Sheets

FIG. 9

CLUTCH APPARATUS FOR AUTOMATIC TRANSMISSION

RELATED APPLICATIONS

This application claims the benefit of the Korean application 1999/19340 filed May 28, 1999 and the International application PCT/KR00/00517 filed May 23, 2000.

BACKGROUND OF THE INVENTION

1. Technical Field

The present invention relates to a clutch apparatus for an automatic transmission, and more particularly, the present invention relates to a clutch apparatus for an automatic transmission, which is disposed between a flywheel of an engine and the automatic transmission in a motor vehicle to connect and disconnect engine power flow to the automatic transmission and to multiply torque.

2. Background Art

Generally, an engine of a motor vehicle cannot start in a state wherein a load is applied thereto and cannot transfer engine power to driving wheels at the same time when the engine starts. Also, on the contrary to the fact that the engine rotates only in one direction, the motor vehicle must be able to run in both forward and backward directions. By reason of these, a clutch is arranged between the engine and a transmission to enable the engine to start in a state wherein no load is applied thereto. The clutch should be able to gradually transfer engine power to the driving wheels to allow the motor vehicle to smoothly move and a speed changing operation to be adequately implemented relying upon driving circumstances. To this end, an automatic transmission which can simultaneously perform a clutching operation and a shift lever manipulating operation in an automated manner, had been developed.

Figure 1:
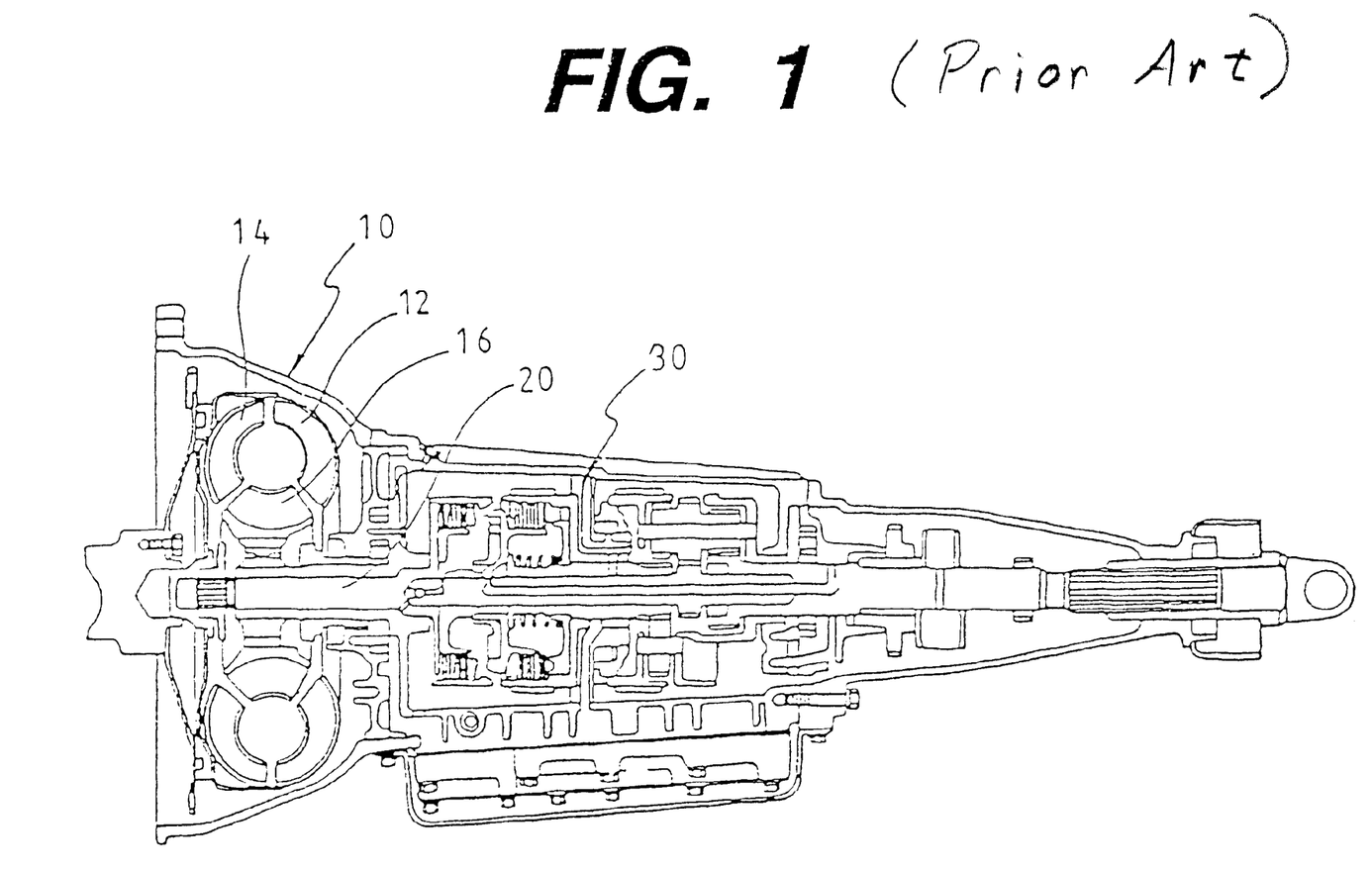
FIG. 1 is a cross-sectional view schematically illustrating a construction of the conventional automatic transmission.

An automatic transmission generally comprises a combination of a torque converter which performs a clutching operation and a transmission section (a planetary gear type transmission section) which performs a speed changing operation. As shown in FIG. 1, the torque converter 10 includes a pump 12, a turbine 14 and a stator 16 which are formed with vanes therein. In the torque converter 10, circulating flow in which oil inside a pump impeller is circulated through the pump 12, the turbine 14 and the stator 16 by centrifugal force, is produced by an engine. By this, the turbine 14 receives engine power to drive a driven shaft 20. In other words, the torque converter 10 simultaneously performs a function of an automatic clutch and of a torque multiplication. Engine power which is transferred to the driven shaft 20, automatically executes a speed changing operation through a hydraulic control mechanism in the transmission section 30, whereby the torque-multiplied engine power is transferred to the driving wheels.

However, the conventional torque converter suffers from defects in that, since the torque converter transfers engine power to the transmission section using fluid, power loss is increased due to fluid friction, etc., whereby a power transferring efficiency is diminished, passing and acceleration capability of the motor vehicle is deteriorated and a difficulty is imposed on obtaining a maximum speed. Moreover, because the conventional torque converter must be necessarily equipped with a complex hydraulic mechanism including the pump, the turbine, the stator and the like and a cooling device for cooling oil which is circulated through the hydraulic mechanism, an entire construction is complicated and manufacturing cost is elevated.

Furthermore, since force of a driven side of the motor vehicle cannot be transferred to a driving side of the motor vehicle along a reverse direction, an engine brake operation cannot be fulfilled, by which an adverse influence is imposed on safe driving. In addition, due to the fact that it is impossible to start the engine by pushing the motor vehicle, it is difficult to cope with an emergency situation such as discharge of a battery.

DISCLOSURE OF INVENTION

Accordingly, the present invention has been made in an effort to solve the problems occurring in the related art, and an object of the present invention is to provide a clutch apparatus for an automatic transmission, which is structured using planetary gears, whereby a power transferring efficiency is increased, a simple construction is achieved and an engine brake operation can be effected.

In order to achieve the above object, according to a first aspect of the present invention, there is provided a clutch apparatus for an automatic transmission, which is arranged at an input end of the automatic transmission to connect and disconnect engine power flow to the automatic transmission and to transfer multiplied torque to the automatic transmission, the clutch apparatus comprising: a clutch base mounted to a flywheel of an engine and having a supporting boss which possesses a cylindrical configuration and is projectedly formed on an inner surface of the clutch base, the supporting boss having first spline grooves which are defined on a circumferential inner surface of the supporting boss; a clutch cover coupled to a circumferential outer portion of the clutch base and having a cylindrical configuration which is opened at one end in a manner such that a space is defined in the clutch cover, the clutch cover being formed, at a center portion of a closed surface thereof, with a center hole through which a driven shaft connected to the automatic transmission is inserted; an output shaft rotatably fitted at one end thereof through the clutch base and at the other end thereof through the center hole of the clutch cover, and having a sun gear which is formed on a circumferential outer surface of the output shaft and second spline grooves which are defined on a circumferential inner surface of the output shaft; a pair of one-way rotating bearings fitted around both ends of the output shaft, respectively, in a manner such that the output shaft can be rotated in one direction which is the same as a rotating direction of the flywheel and cannot be rotated in the other direction which is opposite to the rotating direction of the flywheel; a plurality of planetary gear sections each possessing a guide shaft and a planetary gear, the guide shaft having one end which is rotatably fitted through the clutch base and the other end which is rotatably supported by the clutch cover, the planetary gear being formed on a circumferential outer surface of the guide shaft and being meshed with the sun gear of the output shaft; a rotating member having an internal ring gear and third spline grooves, the internal ring gear being formed on a circumferential inner surface of the rotating member and being meshed with planetary gears of the plurality of planetary gear sections, the third spline grooves being defined on a circumferential outer surface of the rotating member; a multiple disc clutch member having a plurality of inner plates which are fitted around the rotating member and a plurality of outer plates which are fitted into the supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the supporting boss; a pressing plate disposed between the multiple disc clutch member and the clutch cover, the pressing plate being moved by pressing force which is applied thereto in a manner such that the inner plates and the outer plates are tightly engaged one with another and thereby are locked one to another, the pressing plate possessing an annular plate-shaped configuration; pressing means arranged between the pressing plate and the clutch cover for applying pressing force to the pressing plate; and pressing force adjusting means arranged in a circumferential space which is defined between circumferential outer portions of the clutch base and the clutch cover, in a manner such that each pressing force adjusting means is capable of pivoting movement for changing an axial position of the pressing plate and adjusting a magnitude of pressing force which is applied to the multiple disc clutch member, depending upon a magnitude of centrifugal force generated by rotating force which is transferred from the flywheel.

According to a second aspect of the present invention, there is provided a clutch apparatus for an automatic transmission, which is arranged at an input end of the automatic transmission to connect and disconnect engine power flow to the automatic transmission and to transfer multiplied torque to the automatic transmission, the clutch apparatus comprising: a clutch base mounted to a flywheel of an engine and having a supporting boss and a ring gear boss which are projectedly formed on an inner surface of the clutch base in a manner such that the ring gear boss is placed inward of the supporting boss, the supporting boss having first spline grooves which are defined on a circumferential inner surface of the supporting boss, the ring gear boss having a first internal ring gear which is formed on a circumferential inner surface of the ring gear boss; a clutch cover coupled to a circumferential outer portion of the clutch base and having a cylindrical configuration which is opened at one end in a manner such that a space is defined in the clutch cover, the clutch cover being formed, at a center portion of a closed surface thereof, with a center hole through which a driven shaft connected to the automatic transmission is inserted; an output shaft rotatably fitted at one end thereof through the clutch base and at the other end thereof through the center hole of the clutch cover, and having a sun gear which is formed on a circumferential outer surface of the output shaft and second spline grooves which are defined on a circumferential inner surface of the output shaft; a pair of one-way rotating bearings fitted around both ends of the output shaft, respectively, in a manner such that the output shaft can be rotated in one direction which is the same as a rotating direction of the flywheel and cannot be rotated in the other direction which is opposite to the rotating direction of the flywheel; a carrier having a first disc and a second disc which are coupled with each other by means of a plurality of connecting members in a manner such that the first disc and the second disc are spaced apart from each other by a predetermined distance, the first disc being rotatably brought into contact at one surface thereof with the inner surface of the clutch base by the medium of a first thrust bearing, the second disc being rotatably brought into contact with the clutch cover by the medium of a second thrust bearing; a plurality of double planetary gear sections fitted around the plurality of connecting members, respectively, in such a way as to be disposed in the carrier, and each having integrally formed thereon a first planetary gear and a second planetary gear which have different numbers of teeth or different modules, the first planetary gear being meshed with the first internal ring gear, the second planetary gear being meshed with the sun gear of the output shaft; a rotating member possessing a ring-shaped configuration and having a second internal ring gear and third spline grooves, the second internal ring gear being formed on a circumferential inner surface of the rotating member and being meshed with second planetary gears of the plurality of double planetary gear sections, the third spline grooves being defined on a circumferential outer surface of the rotating member, the second and first internal ring gears having different numbers of teeth or different modules; a multiple disc clutch member having a plurality of inner plates which are fitted around the rotating member and a plurality of outer plates which are fitted into the supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the supporting boss; a pressing plate disposed between the multiple disc clutch member and the clutch cover, the pressing plate being moved by pressing force which is applied thereto in a manner such that the inner plates and the outer plates are tightly engaged one with another and thereby are locked one to another, the pressing plate possessing an annular plate-shaped configuration; pressing means arranged between the pressing plate and the clutch cover for applying pressing force to the pressing plate; and pressing force adjusting means arranged in a circumferential space which is defined between circumferential outer portions of the clutch base and the clutch cover, in a manner such that each pressing force adjusting means is capable of pivoting movement for changing an axial position of the pressing plate and adjusting a magnitude of pressing force which is applied to the multiple disc clutch member, depending upon a magnitude of centrifugal force generated by rotating force which is transferred from the flywheel.

BRIEF DESCRIPTION OF DRAWINGS

The above objects, and other features and advantages of the present invention will become more apparent after a reading of the following detailed description when taken in conjunction with the drawings, in which.

BEST MODE FOR CARRYING OUT THE INVENTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
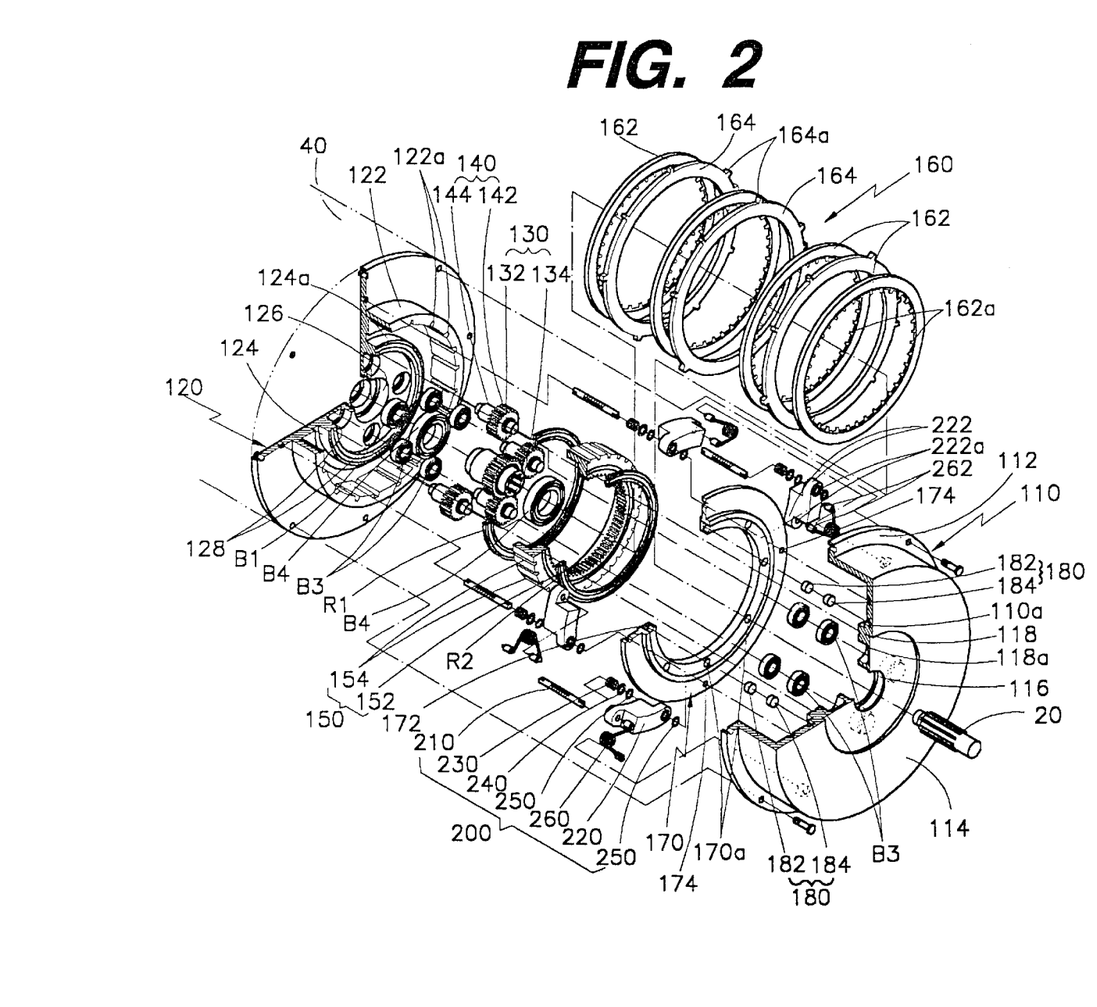
FIG. 2 is an exploded perspective view illustrating a clutch apparatus for an automatic transmission in accordance with a first embodiment of the present invention.
Figure 3:
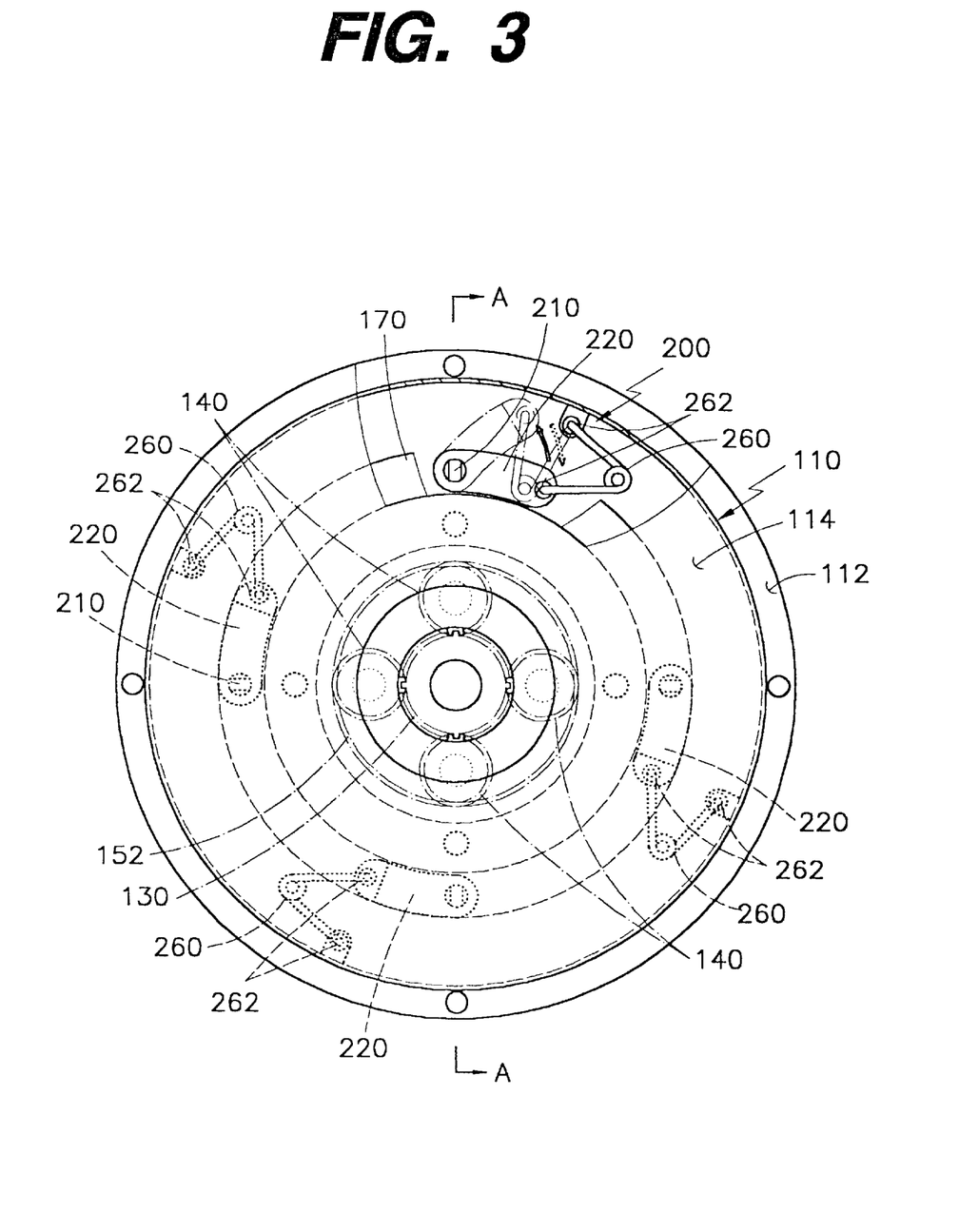
FIG. 3 is a partially broken-away schematic front view illustrating an operation of the clutch apparatus for an automatic transmission in accordance with the first embodiment of the present invention.

FIG. 2 is an exploded perspective view illustrating a clutch apparatus for an automatic transmission in accordance with a first embodiment of the present invention; FIG. 3 is a partially broken-away schematic front view illustrating an operation of the clutch apparatus for an automatic transmission in accordance with the first embodiment of the present invention; and FIG. 4 is a cross-sectional view taken along the line A—A of FIG. 3, illustrating the clutch apparatus for an automatic transmission in accordance with the first embodiment of the present invention.

Figure 4:
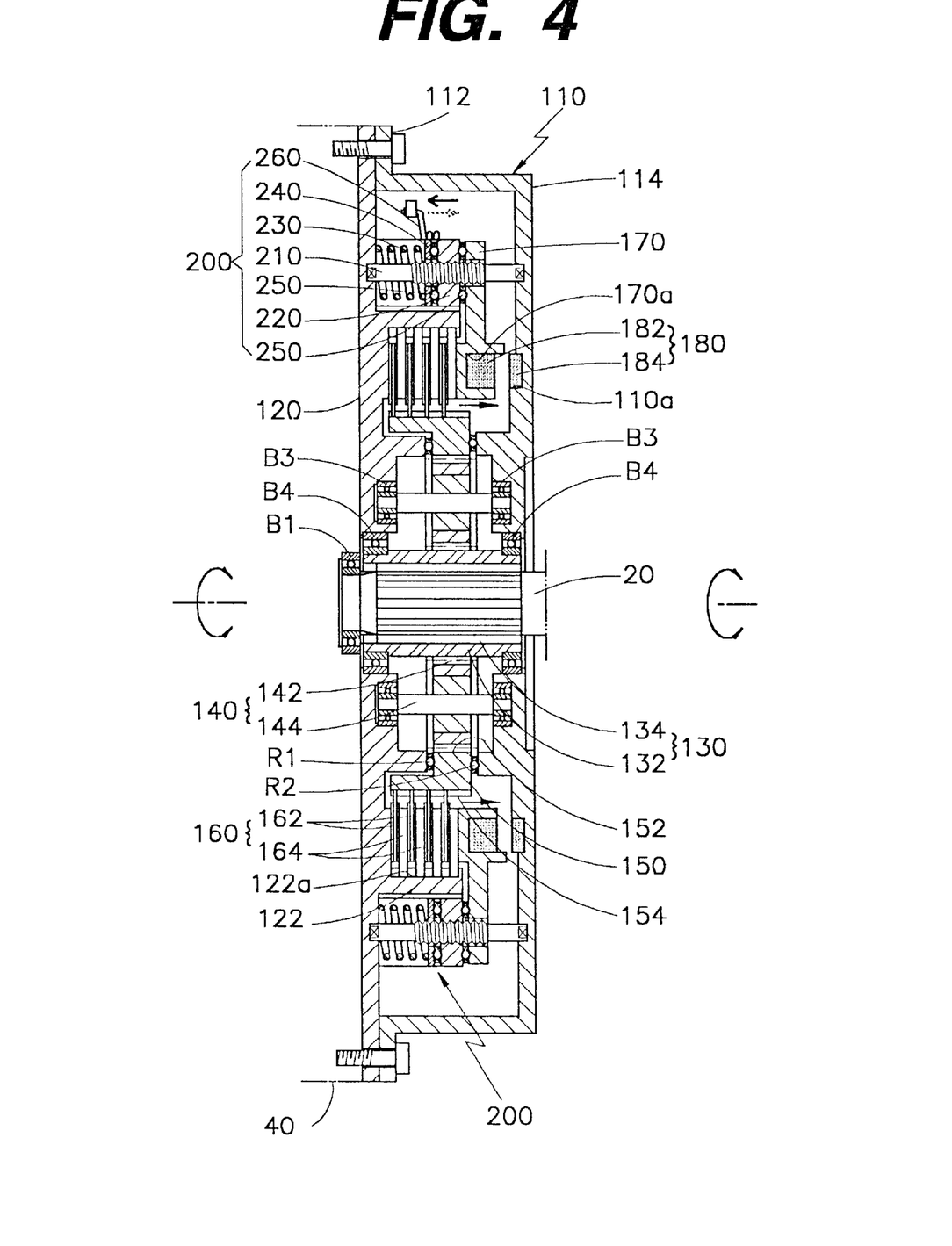
FIG. 4 is a cross-sectional view taken along the line A—A of FIG. 3, illustrating the clutch apparatus for an automatic transmission in accordance with the first embodiment of the present invention.

As shown in FIGS. 2 through 4, a clutch apparatus for an automatic transmission in accordance with a first embodiment of the present invention includes a clutch base 120 mounted to a flywheel 40 of an engine and having a supporting boss 122 which is projectedly formed on an inner surface of the clutch base 120, a clutch cover 110 secured to the clutch base 120, an output shaft 130 rotatably disposed between the clutch base 120 and the clutch cover 110, a pair of one-way rotating bearings B4 fitted around both ends of the output shaft 130, respectively, in a manner such that the output shaft 130 can be rotated in one direction which is the same as a rotating direction of the flywheel 40 and cannot be rotated in the other direction which is opposite to the rotating direction of the flywheel 40, a plurality of planetary gear sections 140 rotatably disposed between the clutch base 120 and the clutch cover 110 in a manner such that they are operatively connected to a circumferential outer surface of the output shaft 130, a rotating member 150 having a circumferential inner surface which is operatively connected to the plurality of planetary gear sections 140, a multiple disc clutch member 160 splined to a circumferential outer surface of the rotating member 150 and a circumferential inner surface of the supporting boss 122, a pressing plate 170 disposed between the multiple disc clutch member 160 and the clutch cover 110 for applying pressing force to the multiple disc clutch member 160, pressing means 180 arranged between the pressing plate 170 and the clutch cover 110 for applying pressing force to the pressing plate 170, and pressing force adjusting means 200 arranged in a circumferential space which is defined between circumferential outer portions of the clutch base 120 and the clutch cover 110, in a manner such that each pressing force adjusting means 200 is capable of pivoting movement for changing an axial position of the pressing plate 170 and adjusting a magnitude of pressing force which is applied to the multiple disc clutch member 160, depending upon a magnitude of centrifugal force generated by rotating force which is transferred from the flywheel 40. The clutch apparatus according to this embodiment of the present invention is installed between the engine and the automatic transmission to connect and disconnect engine power flow to the automatic transmission and to transfer multiplied torque to the automatic transmission.

The clutch base 120 possesses a disc-shaped configuration. The supporting boss 122 is projectedly formed on the inner surface of the clutch base 120 and possesses a cylindrical configuration. First spline grooves 122a are defined on the circumferential inner surface of the supporting boss 122. The clutch base 120 further has a bearing supporting boss 124 which is projectedly formed on the inner surface of the clutch base 120 inward of the supporting boss 122. A ball seating groove 124a is defined on a free end surface of the bearing supporting boss 124. An output shaft inserting hole 126 through which one end of the output shaft 130 is inserted, is defined at a center portion of the clutch base 120 inside the bearing supporting boss 124. Shaft inserting holes 128 through which one ends of the plurality of planetary gear sections 140 are inserted, are defined around the output shaft inserting hole 126 inside the bearing supporting boss 124.

The clutch cover 110 is coupled through an outward flange portion 112 to a circumferential outer portion of the clutch base 120 and possesses a cylindrical configuration which is opened at one end in a manner such that a space is defined in the clutch cover 110. The clutch cover 110 is formed, at a center portion of a closed surface 114 thereof, with a center hole 116 through which a driven shaft 20 connected to the automatic transmission is inserted. Planetary gear supporting bosses 118 having shaft inserting holes 118a into which the other ends of the plurality of planetary gear sections 140 are fitted, are projectedly formed on an inner surface of the clutch cover 110.

The output shaft 130 is rotatably fitted at one end thereof through the output shaft inserting hole 126 of the clutch base 120 and at the other end thereof through the center hole 116 of the clutch cover 110. The output shaft 130 has a sun gear 132 which is formed on the circumferential outer surface of the output shaft 130 and second spline grooves 134 which are defined on a circumferential inner surface of the output shaft 130. The driven shaft 20 is splined into the second spline grooves 134.

Each of the plurality of planetary gear sections 140 possesses a guide shaft 144 and a planetary gear 142. The guide shaft 144 has one end which is rotatably fitted through the shaft inserting hole 128 of the clutch base 120 and the other end which is rotatably fitted through the shaft inserting hole 118a of the clutch cover 110. The planetary gear 142 is formed on a circumferential outer surface of the guide shaft 144 and is meshed with the sun gear 132 of the output shaft 130. While four planetary gear sections 140 are provided in this first embodiment of the present invention, a person skilled in the art will readily appreciate that two or more planetary gear sections can be properly used without departing from the scope of the present invention.

A plurality of bearings B3 are fitted around both ends of the guide shafts 144 of the plurality of planetary gear sections 140.

The rotating member 150 has an internal ring gear 152 and third spline grooves 154. The internal ring gear 152 is formed on the circumferential inner surface of the rotating member 150 and is meshed with the planetary gears 142 of the plurality of planetary gear sections 140. The third spline grooves 154 are defined on the circumferential outer surface of the rotating member 150.

The multiple disc clutch member 160 has a plurality of inner plates 162 which are fitted around the rotating member 150 and a plurality of outer plates 364 which are fitted into the supporting boss 122 of the clutch base 120 and each of which is intervened between two adjoining inner plates 162. Each inner plate 162 has spline teeth 162a which are formed on a circumferential inner surface thereof and are splined into the third spline grooves 154 of the rotating member 150. Each outer plate 164 has spline teeth 164a which are formed on a circumferential outer surface thereof and are splined into the first spline grooves 122a of the supporting boss 122 of the clutch base 120.

The pressing plate 170 is correspondingly disposed between the multiple disc clutch member 160 and the clutch cover 110. The pressing plate 170 is moved by pressing force which is applied thereto in a manner such that the inner plates 162 and the outer plates 164 are tightly engaged one with another and thereby are locked one to another. The pressing plate 170 possesses an annular plate-shaped configuration. A pressing surface 172 is projectedly defined on an inner surface of the pressing plate 170. Adjacent to a circumferential outer edge of the pressing plate 170, there are defined a plurality of support bar inserting holes 174 in a manner such that they are spaced apart one from another by a predetermined angle, in a circumferential direction.

The pressing means 180 comprises a plurality of first magnets 182 which are disposed on an outer surface of the pressing plate 170 to define a circular arrangement, and a plurality of second magnets 184 which are disposed on the inner surface of the clutch cover 110 in a manner such that the second magnets 184 are opposite to the first magnets 182, respectively. The first and second magnets 182 and 184 have the same polarity to create repulsive force therebetween.

A plurality of magnet receiving grooves 170a and 110a are defined on the outer surface of the pressing plate 170 and the inner surface of the clutch cover 110 so that the first magnets 182 and the second magnets 184 of the pressing means 180 are received in the magnet receiving grooves 170a and 110a, respectively.

Each pressing force adjusting means 200 includes a support bar 210, a balancing weight 220, a compression spring 230, a bearing-supporting ring 240, a pair of guide bearings 250, and an elastic member 260. The support bar 210 is fastened at both ends thereof to the clutch base 120 and the clutch cover 110, respectively, in a manner such that the support bar 210 is arranged in the circumferential space which is defined between circumferential outer portions of the clutch base 120 and the clutch cover 110 and the pressing plate 170 is fitted around the support bar 210 to be capable of being moved in an axial direction. The support bar 210 has an externally threaded portion which is formed on a circumferential outer surface and at a middle portion of the support bar 210. The balancing weight 220 has one end which is fitted around the support bar 210, to be pivotally rotated about the one end. The compression spring 230 is fitted around the support bar 210 for applying elastic force to the balancing weight 220. The bearing-supporting ring 240 is fitted around the support bar 210 in a manner such that the bearing-supporting ring 210 is brought into contact with an end of the compression spring 230. The pair of guide bearings 250 are fitted around the support bar 210 and located at both sides, respectively, of the one end of the balancing weight 220, to smooth pivotal rotation of the balancing weight 220. The elastic member 260 has one end which is secured to the other end of the balancing weight 220 and the other end which is secured to the inner surface of the clutch cover 110, so that the elastic member 260 can return the balancing weight 220 which is pivotally rotated by the centrifugal force, to its original position.

The balancing weight 220 possesses substantially a hexahedron-shaped configuration. The balancing weight 220 is formed, at both ends thereof, with two semi-circular coupling portions 222 each of which is defined with a bore 222a. A circumferential ball seating groove is defined around the bore 222a on a surface of the semi-circular coupling portion 222 which surface faces the support bar inserting hole 174, to allow the balls of the guide bearing 250 to be received therein.

The elastic member 260 comprises a torsion spring, and bushings 262 are fitted around both ends of the elastic member 260, respectively. One end of the elastic member 260 is inserted through the bore 222a which is defined in one semi-circular coupling portion 222 of the balancing weight 220, and the other end of the elastic member 260 is secured to the inner surface of the clutch cover 110.

On the other hand, a first thrust bearing R1 is intervened between the bearing supporting boss 124 of the clutch base 120 and one end of the rotating member 150, a second thrust bearing R2 is intervened between the other end of the rotating member 150 and the inner surface of the clutch cover 110, and both end surfaces of the rotating member 150 and the inner surface of the clutch cover 110, on which the first and second thrust bearings R1 and R2 are seated, respectively, are formed with ball seating grooves to allow balls of the bearings R1 and R2 to be rollably received therein.

In FIGS. 2 through 4, the drawing reference numeral B1 represents a bearing on which one end of the driven shaft 20 is rotatably supported.

Hereinafter, operations of the clutch apparatus for an automatic transmission according to the first embodiment of the present invention will be described in detail.

As can be readily seen from FIGS. 3 and 4, due to the repulsive force which is developed between the first magnets 182 and the second magnets 184, the pressing plate 170 exerts pressing force on the multiple disc clutch member 160, and, by dint of this, the inner plates 162 and the outer plates 164 are tightly engaged one with another. That is to say, if rotating force is transferred to the flywheel 40 as the engine is driven, since the outer plates 164 are splined into the first spline grooves 122a which are defined on the circumferential inner surface of the supporting boss 122 of the clutch base 120 and the inner plates 162 are splined into the third spline grooves 154 which are defined on the circumferential outer surface of the rotating member 150, the inner plates 162 and the outer plates 164 are tightly engaged one with another, and, in this state, the rotating member 150 cannot be rotated.

Because rotation of the rotating member 150 is impossible, the rotating force of the flywheel 40, which is transferred to the internal ring gear 152 of the rotating member 150 through the plurality of planetary gear sections 140, flows to the sun gear 132 of the output shaft 130, which is meshed with the planetary gears 142 of the planetary gear sections 140, and then, is transferred to the driven shaft 20 which is splined into the second spline grooves 134 of the output shaft 130.

Accordingly, the rotating force of the flywheel 40, which is generated by driving of the engine, flows to the automatic transmission through the driven shaft 20.

In the meanwhile, when the inner plates 162 and the outer plates 164 of the multiple disc clutch member 160 are tightly engaged one with another by external force which is generated by the pressing means 180 and the rotating force of the flywheel 40 is transferred to the driven shaft 20, the pressing force adjusting means 200 serve to maximize a power transfer efficiency, depending upon an engine RPM. Namely, in the case that a driver forcibly depresses an accelerator pedal, as an engine RPM increases, the flywheel 40 is rotated at a high rotational velocity. With this, as an RPM of the clutch base 120 and the clutch cover 110 which are rotated in an interlocked manner with the flywheel 40, increases, centrifugal force is generated by the balancing weights 220 which are arranged in the circumferential space which in turn is defined between the circumferential outer portions of the clutch base 120 and the clutch cover 110, whereby the balancing weights 220 are pivotally rotated in a direction which is shown by a solid arrow in FIG. 3. According to this, the compression springs 230 are compressed and the balancing weights 220 are moved along the support bars 210 in a direction which is shown by a solid arrow in FIG. 4.

Therefore, because the pressing plate 170 is freed from a state wherein it is maintained at a fixed location by elastic force of the compression springs 230, the pressing plate 170 is forcibly pushed by the repulsive force which is generated by the first and second magnets 182 and 184, toward the multiple disc clutch member 160. By this, biasing force for tightly engaging the inner plates 162 and the outer plates 164 of the multiple disc clutch member 160 one with another is increased, whereby the rotating force of the flywheel 40 is transferred to the driven shaft 20 in a precise manner.

In other words, in the case that an engine RPM increases, power transfer of high precision and high efficiency can be accomplished.

On the other hand, if the driver decreases depressing force which is applied to the accelerator pedal, as an engine RPM decreases, the flywheel 40 is rotated at a low rotational velocity. Also, since an RPM of the clutch base 120 and the clutch cover 110 which are rotated in the interlocked manner with the flywheel 40, decreases, centrifugal force which is generated by the balancing weights 220 arranged in the circumferential space, is also reduced. According to this, the balancing weights 220 are returned to their original positions by the elastic force of the elastic members 260 in a direction which is shown by a dotted arrow in FIG. 3. At this time, as the balancing weights 220 are returned to their original positions after being moved along the support bars 210, respectively, in a direction which is shown by a dotted arrow in FIG. 4, the pressing plate 170 is also returned to its original position, whereby pressing force which is applied to the multiple disc clutch member 160, is reduced to be set to an initial value.

Accordingly, by the presence of the pressing force adjusting means 200, power transfer is implemented in an adequate manner, depending upon an engine RPM, whereby high efficiency power transfer is possible.

Meanwhile, because the pair of one-way rotating bearings B4 support the output shaft 130 in a manner such that the output shaft 130 can be rotated in the one direction which is the same as the rotating direction of the flywheel 40 and cannot be rotated in the other direction which is opposite to the rotating direction of the flywheel 40, if rotating force is transferred to the pair of one-way rotating bearings B4 in a reverse direction from the driven shaft 20, the rotating force can flow to the flywheel 40 through the output shaft 130, the planetary gears 142 and the clutch base 120. As a consequence, an engine brake operation can be fulfilled, by which it is possible to ensure safe driving of a motor vehicle and the engine can be started by pushing the motor vehicle under an emergency situation such as discharge of a battery.

Figure 5:
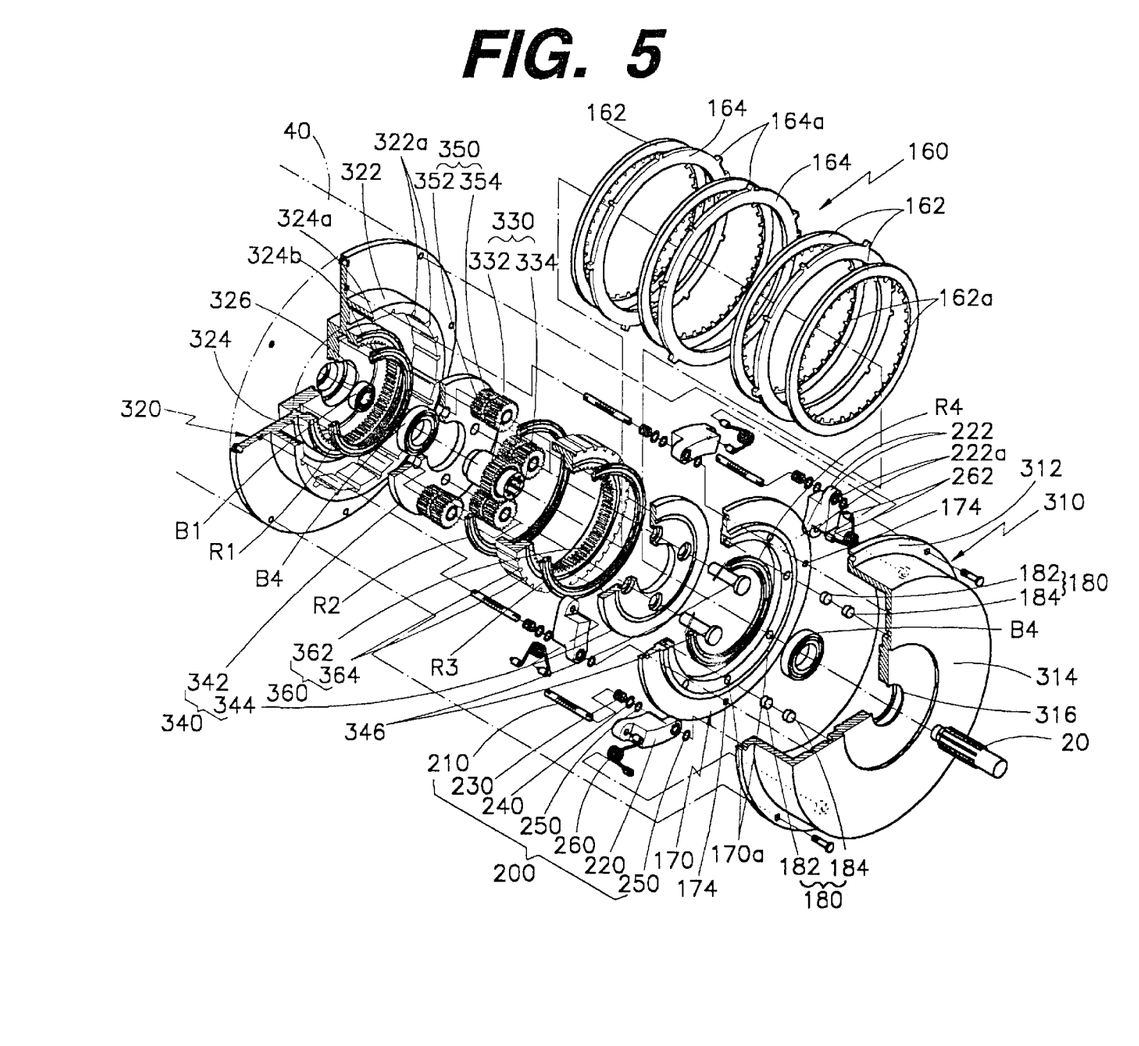
FIG. 5 is an exploded perspective view illustrating a clutch apparatus for an automatic transmission in accordance with a second embodiment of the present invention.
Figure 6:
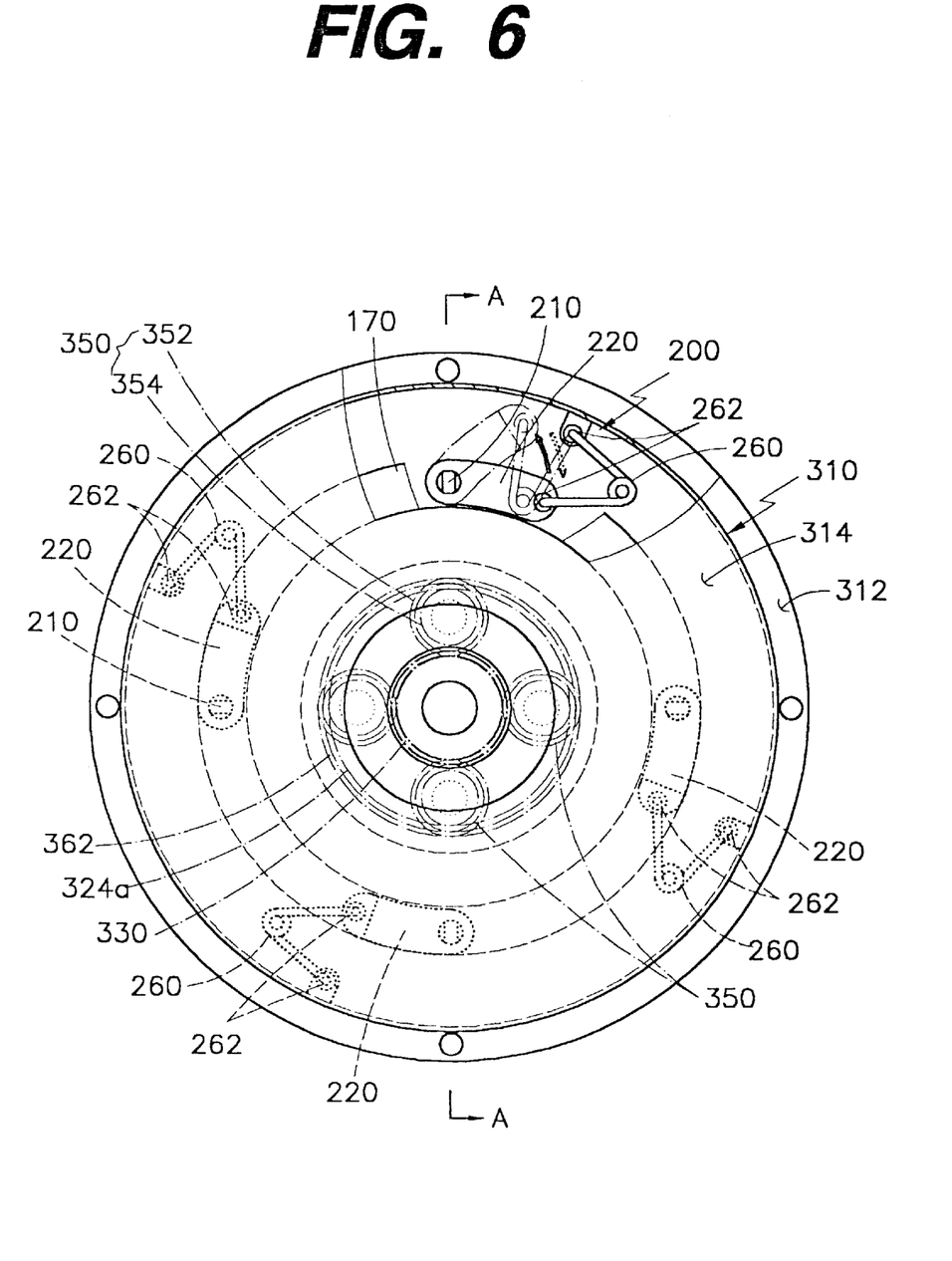
FIG. 6 is a partially broken-away schematic front view illustrating an operation of the clutch apparatus for an automatic transmission in accordance with the second embodiment of the present invention.
Figure 7:
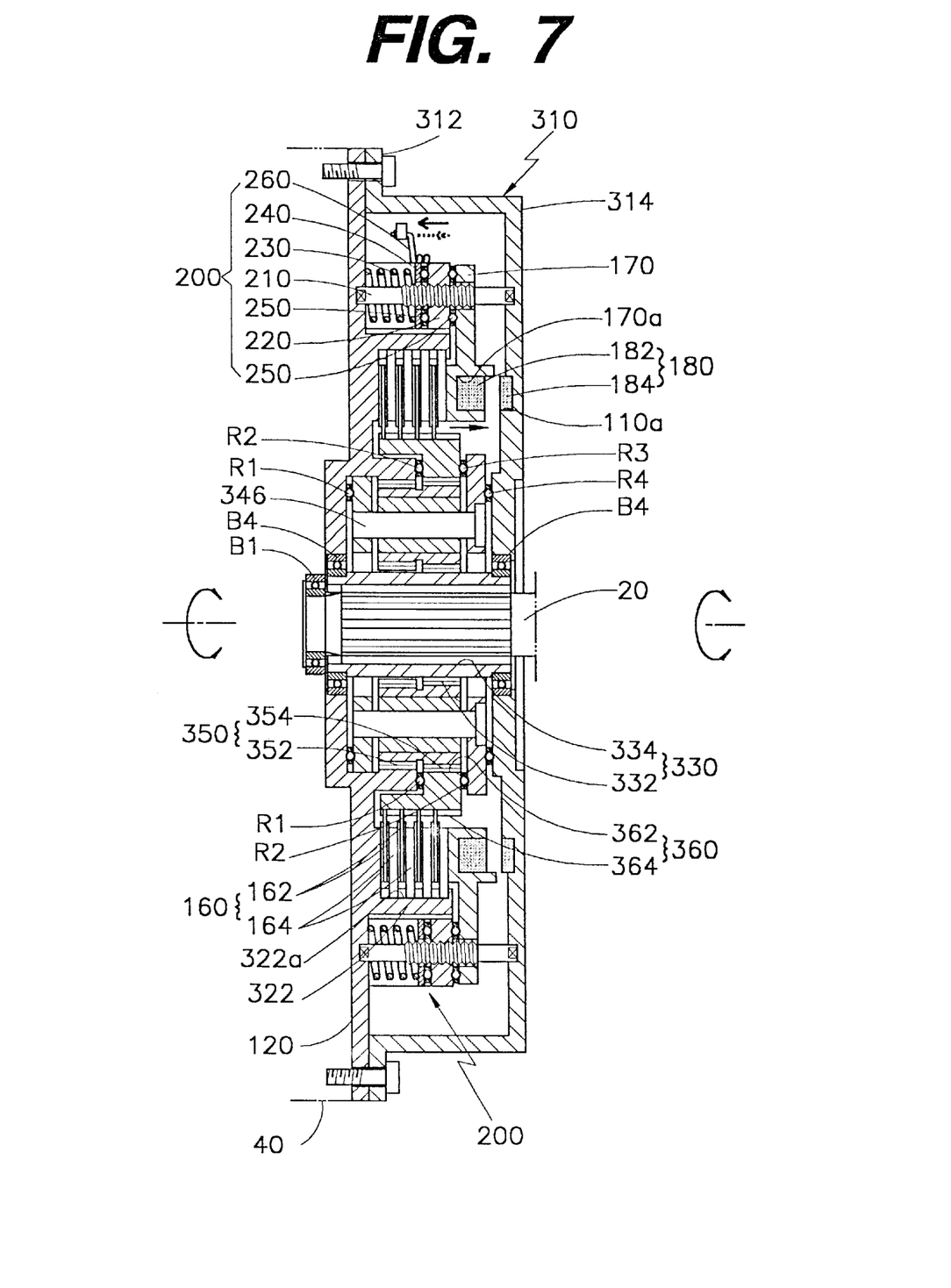
FIG. 7 is a cross-sectional view taken along the line A—A of FIG. 6, illustrating the clutch apparatus for an automatic transmission in accordance with the second embodiment of the present invention.

FIG. 5 is an exploded perspective view illustrating a clutch apparatus for an automatic transmission in accordance with a second embodiment of the present invention; FIG. 6 is a partially broken-away schematic front view illustrating an operation of the clutch apparatus for an automatic transmission in accordance with the second embodiment of the present invention; and FIG. 7 is a cross-sectional view taken along the line A—A of FIG. 6, illustrating the clutch apparatus for an automatic transmission in accordance with the second embodiment of the present invention. In this second embodiment of the present invention, the same drawing reference numerals will be used to designate the same parts as those in the first embodiment of the present invention.

As shown in FIGS. 5 through 7, a clutch apparatus for an automatic transmission in accordance with a second embodiment of the present invention includes a clutch base 320 mounted to a flywheel 40 of an engine and having a supporting boss 322 and a ring gear boss 324 which are projectedly formed on an inner surface of the clutch base 320 in a manner such that the ring gear boss 324 is placed inward of the supporting boss 322, a clutch cover 310 secured to the clutch base 320, an output shaft 330 rotatably disposed between the clutch base 320 and the clutch cover 310, a pair of one-way rotating bearings B4 fitted around both ends of the output shaft 330, respectively, in a manner such that the output shaft 330 can be rotated in one direction which is the same as a rotating direction of the flywheel 40 and cannot be rotated in the other direction which is opposite to the rotating direction of the flywheel 40, a carrier 340 disposed between the clutch base 320 and the clutch cover 310, a plurality of double planetary gear sections 350 arranged in the carrier 340 and each having integrally formed thereon a first planetary gear 352 which is operatively connected to the ring gear boss 324 and a second planetary gear 354 which is operatively connected to the output shaft 330, a rotating member 360 having a circumferential inner surface which is operatively connected to second planetary gears 354 of the plurality of double planetary gear sections 350, a multiple disc clutch member 160 splined to a circumferential outer surface of the rotating member 360 and a circumferential inner surface of the supporting boss 322, a pressing plate 170 for applying pressing force to the multiple disc clutch member 160, pressing means 180 for applying pressing force to the pressing plate 170, and pressing force adjusting means 200 arranged in a circumferential space which is defined between circumferential outer portions of the clutch base 320 and the clutch cover 310, in a manner such that each pressing force adjusting means 200 is capable of pivoting movement for changing an axial position of the pressing plate 170 and adjusting a magnitude of pressing force which is applied to the multiple disc clutch member 160, depending upon a magnitude of centrifugal force generated by rotating force which is transferred from the flywheel 40. The clutch apparatus according to this embodiment of the present invention is installed between the engine and the automatic transmission to connect and disconnect engine power flow to the automatic transmission and to transfer multiplied torque to the automatic transmission.

The clutch base 320 possesses a disc-shaped configuration. As described above, the supporting boss 322 and the ring gear boss 324 are formed on the inner surface of the clutch base 320. The supporting boss 322 and the ring gear boss 324 possess a cylindrical configuration and a ring-shaped configuration, respectively. An output shaft inserting hole 326 through which one end of the output shaft 330 is inserted, is defined at a center portion of the clutch base 320. First spline grooves 322a are defined on the circumferential inner surface of the supporting boss 322. A first internal ring gear 324a is formed on a circumferential inner surface of the ring gear boss 324.

The clutch cover 310 is coupled to a circumferential outer portion of the clutch base 320 and possesses a cylindrical configuration which is opened at one end in a manner such that a space is defined in the clutch cover 310. An outward flange portion 312 is formed at the one end of the clutch cover 310 in a manner such that the outward flange portion 312 extends in radial and circumferential directions to allow the clutch cover 310 to be coupled to the clutch base 320 thereat. The clutch cover 310 is formed, at a center portion of a closed surface 314 thereof, with a center hole 316 through which a driven shaft 20 connected to the automatic transmission is inserted.

The output shaft 330 is rotatably fitted at one end thereof through the output shaft inserting hole 326 of the clutch base 320 and at the other end thereof through the center hole 316 of the clutch cover 310. The output shaft 330 has a sun gear 332 which is formed on a circumferential outer surface of the output shaft 330 and second spline grooves 334 which are defined on a circumferential inner surface of the output shaft 330.

The carrier 340 has a first disc 342 and a second disc 344 which are coupled with each other by means of a plurality of connecting members 346 in a manner such that the first disc 342 and the second disc 344 are spaced apart from each other by a predetermined distance. The first disc 342 is rotatably brought into contact at one surface thereof with the inner surface of the clutch base 320 by the medium of a first thrust bearing R1, and the second disc 344 is rotatably brought into contact with the clutch cover 310 by the medium of a fourth thrust bearing R4.

The first planetary gear 352 of the double planetary gear section 350 is meshed with the first internal ring gear 324a of the ring gear boss 324, and the second planetary gear 354 of the double planetary gear section 350 is meshed with the sun gear 332 of the output shaft 330.

The rotating member 360 possesses a ring-shaped configuration and has a second internal ring gear 362 and third spline grooves 364. The second internal ring gear 362 is formed on the circumferential inner surface of the rotating member 360 and is meshed with the second planetary gears 354 of the plurality of double planetary gear sections 350. The third spline grooves 364 are defined on the circumferential outer surface of the rotating member 360. At this time, the second internal ring gear 362 is formed to have the number of teeth or a module which is different from that of the first internal ring gear 324a.

The multiple disc clutch member 160 has a plurality of inner plates 162 which are fitted around the rotating member 360 and a plurality of outer plates 164 which are fitted into the supporting boss 322 of the clutch base 320 and each of which is intervened between two adjoining inner plates 162. Each inner plate 162 has spline teeth 162a which are formed on a circumferential inner surface thereof and are splined into the third spline grooves 364 of the rotating member 360. Each outer plate 164 has spline teeth 164a which are formed on a circumferential outer surface thereof and are splined into the first spline grooves 322a of the supporting boss 322.

The pressing plate 170, the pressing means 180 and the pressing force adjusting means 200 of this embodiment are structured in the same way as those of the first embodiment.

On the other hand, a second thrust bearing R2 is intervened between the ring gear boss 324 of the clutch base 320 and one end of the rotating member 360, and a third thrust bearing R3 is intervened between the other end of the rotating member 360 and the second disc 344 of the carrier 340, to enable the rotating member 360 to be smoothly rotated.

Both end surfaces of the rotating member 360 and the inner surfaces of the clutch base 320 and the clutch cover 310, on which the first and fourth thrust bearings R1 and R4 are seated, respectively, are formed with ball seating grooves as denoted by the drawing reference numeral 324b, to allow balls of the bearings R1 and R4 to be rollably received therein.

In FIGS. 5 through 7, the drawing reference numeral B1 represents a bearing on which one end of the driven shaft 20 is rotatably supported.

Hereinafter, operations of the clutch apparatus for an automatic transmission according to the second embodiment of the present invention will be described in detail.

As shown in FIGS. 5 through 7, in the clutch apparatus for an automatic transmission, according to the second embodiment of the present invention, due to the repulsive force which is developed between the first magnets 182 and the second magnets 184 of the pressing means 180, the pressing plate 170 exerts pressing force on the multiple disc clutch member 160, and, by dint of this, the inner plates 162 and the outer plates 164 are tightly engaged one with another.

At this time, due to the fact that the outer plates 164 are splined to the supporting boss 322 of the clutch base 320 and the inner plates 162 are splined to the rotating member 360, in a state wherein the inner plates 162 and the outer plates 164 are tightly engaged one with another, the rotating member 360 cannot be rotated.

Rotating force of the flywheel 40 is transferred to the first planetary gears 352 of the plurality of double planetary gear sections 350, which are meshed with the first internal ring gear 324a of the ring gear boss 324 of the clutch base 320, and then, to the second planetary gears 354 which are integrally formed with the first planetary gears 352. However, as described above, because the rotating member 360 is captured by the multiple disc clutch member 160 and thereby cannot be rotated, the rotating force of the flywheel 40 is transferred to the sun gear 332 of the output shaft 330, which is meshed with the second planetary gears 354, to rotate the output shaft 330, and then, is transferred to the driven shaft 20 which is inserted into the output shaft 330.

Accordingly, the rotating force of the flywheel 40, which is generated by driving of the engine, flows to the automatic transmission through the driven shaft 20.

In the meanwhile, as aforementioned above when describing the operations of the clutch apparatus according to the first embodiment, when the inner plates 162 and the outer plates 164 of the multiple disc clutch member 160 are tightly engaged one with another by the pressing means 180 and the rotating force of the flywheel 40 is transferred to the driven shaft 20, the pressing force adjusting means 200 serve to maximize a power transfer efficiency, depending upon an engine RPM. Therefore, power transfer is effected in an optimal manner relying upon an engine RPM.

In the procedure of transferring engine power, wherein the rotating force of the flywheel 40 is transferred in order of the first planetary gears 352, the second planetary gears 354 and the sun gear 332, a predetermined reduction gear ratio is obtained by the first and second planetary gears 352 and 354 which have different numbers of teeth or different modules.

Hence, a friction rate of the multiple disc clutch member 160 is lessened and thereby a lifetime of components of the clutch apparatus is lengthened.

Meanwhile, because the pair of one-way rotating bearings B4 support the output shaft 330 in a manner such that the output shaft 330 can be rotated in the one direction which is the same as the rotating direction of the flywheel 40 and cannot be rotated in the other direction which is opposite to the rotating direction of the flywheel 40, if rotating force is transferred to the pair of one-way rotating bearings B4 in a reverse direction from the driven shaft 20, the rotating force can flow to the flywheel 40 through the output shaft 330, the first and second planetary gears 352 and 354 and the clutch base 320. As a consequence, an engine brake operation can be fulfilled, by which it is possible to ensure safe driving of a motor vehicle and the engine can be started by pushing the motor vehicle under an emergency situation such as discharge of a battery.

Figure 8:
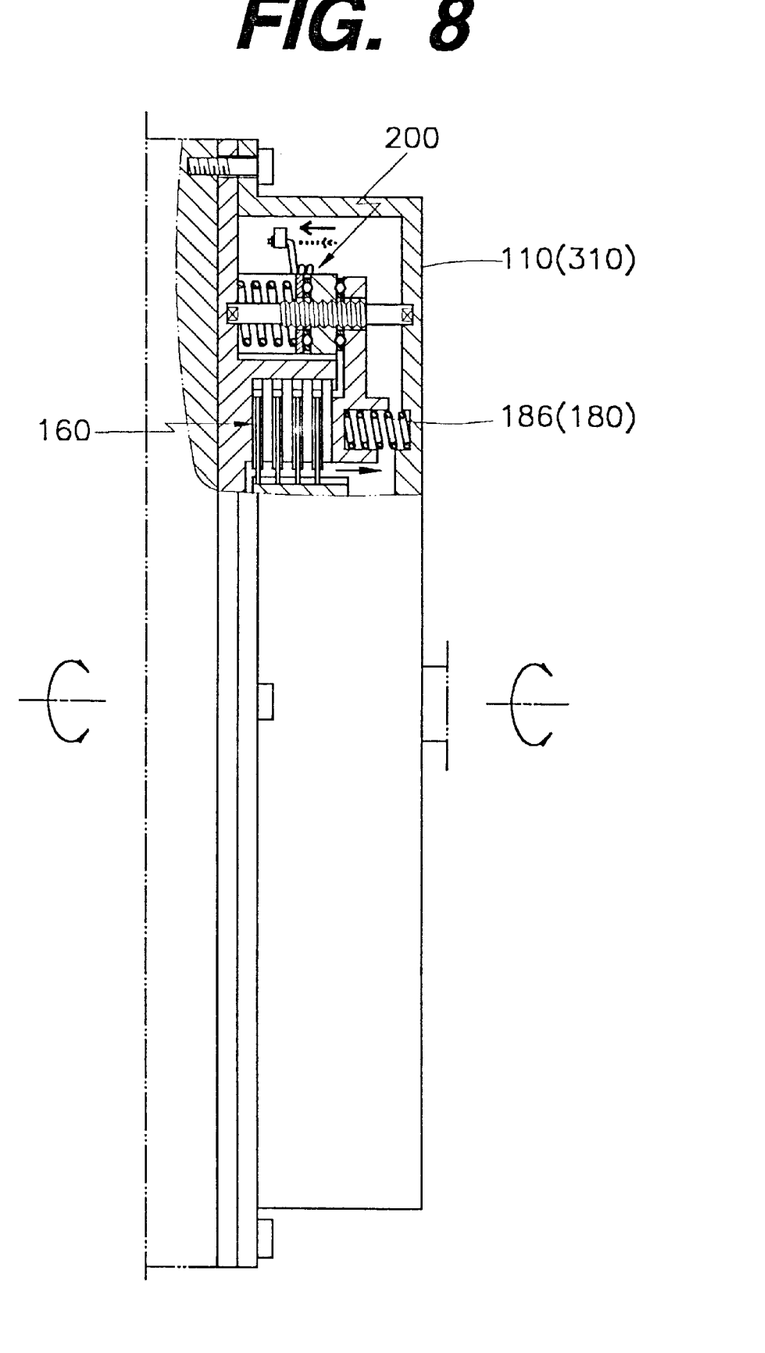
FIG. 8 is a partially broken-away side view illustrating a clutch apparatus for an automatic transmission in accordance with a third embodiment of the present invention.

FIG. 8 is a partially broken-away side view illustrating a clutch apparatus for an automatic transmission in accordance with a third embodiment of the present invention. In this third embodiment of the present invention, the same drawing reference numerals will be used to designate the same parts as those in the first and second embodiments of the present invention.

A clutch apparatus for an automatic transmission in accordance with a third embodiment of the present invention can be constructed in the same way as that of the first embodiment or the second embodiment, except that the pressing means 180 for applying pressing force to the pressing plate 170 comprises a plurality of coil springs 186 which have one ends which are fastened to the outer surface of the pressing plate 170 and the other ends which are fastened to the inner surface of the clutch cover 110 or 310.

The outer surface of the pressing plate 170 to which the one ends of the coil springs 186 are fastened and the inner surface of the clutch cover 110 or 310 to which the other ends of the coil springs 186 are fastened, are formed with a plurality of spring inserting grooves.

On the other hand, the plurality of coil springs 186 perform the same function of pressing the pressing plate 170 as the first and second magnets 182 and 184 of the first and second embodiments.

Figure 9:
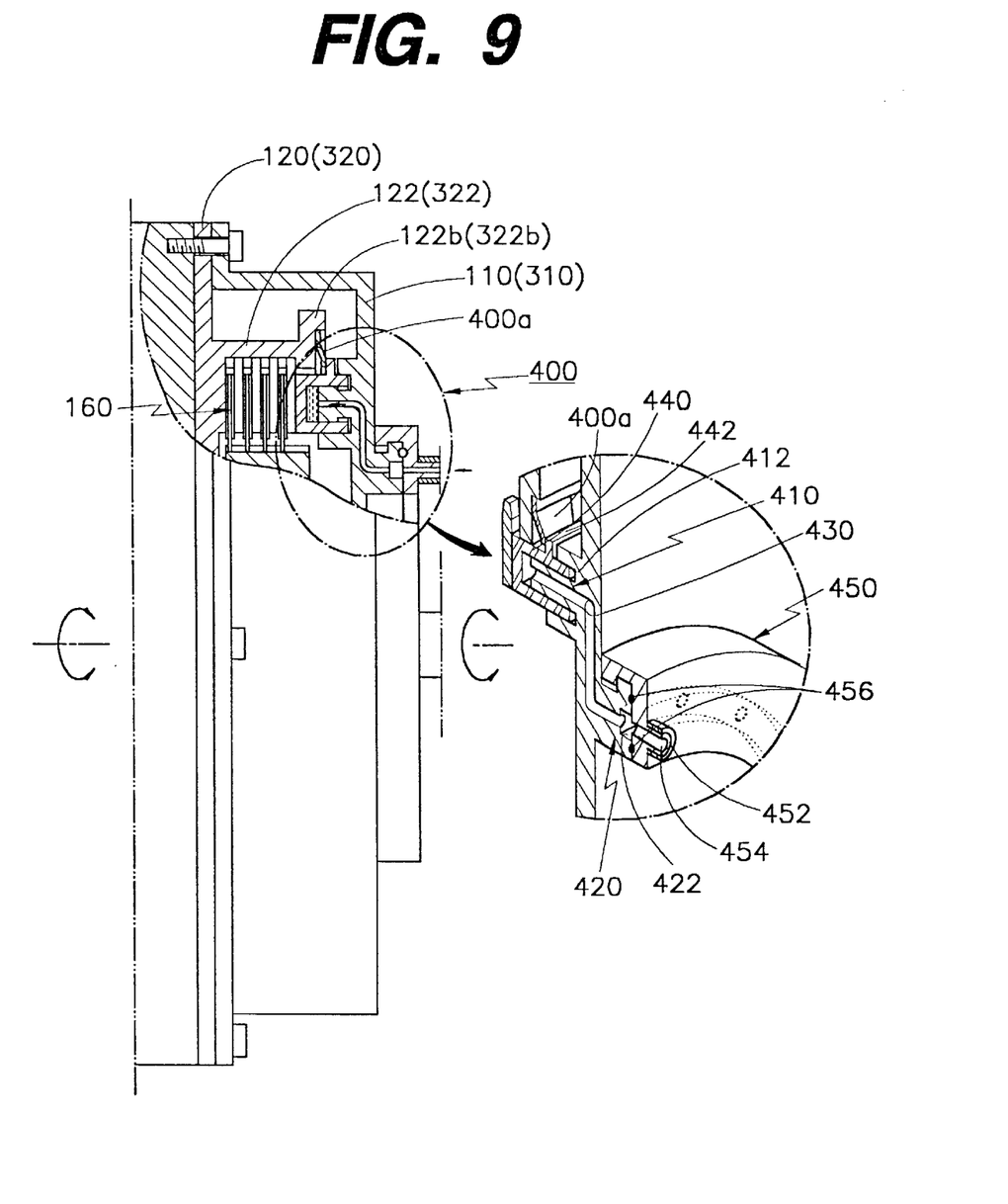
FIG. 9 is a partially broken-away and partially perspectively enlarged side view illustrating a clutch apparatus for an automatic transmission in accordance with a fourth embodiment of the present invention.

FIG. 9 is a partially broken-away and partially perspectively enlarged side view illustrating a clutch apparatus for an automatic transmission in accordance with a fourth embodiment of the present invention. In this fourth embodiment of the present invention, the same drawing reference numerals will be used to designate the same parts as those in the first and second embodiments of the present invention.

A clutch apparatus for an automatic transmission in accordance with a fourth embodiment of the present invention can be constructed in the same way as that of the first embodiment or the second embodiment, except that the pressing means 180 for pressing the multiple disc clutch member 160 comprises a hydraulic device 400 which is disposed in the clutch cover 110 or 310 and controlled by a control unit (not shown) controlling engine output, such as an engine electronic control module or the like, and an annular leaf spring 400*a* is installed on the supporting boss 122 or 322 of the clutch base 120 or 320 to exert elastic pressing force on the hydraulic device 400 thereby to remove external force which is applied to the multiple disc clutch member 160 by the hydraulic device 400. In the clutch apparatus according to this embodiment of the present invention, a magnitude of pressing force which is applied to the multiple disc clutch member 160 is adjusted by the hydraulic device 400, whereby a separate pressing force adjusting means as given in the first and second embodiments are not needed.

The hydraulic device 400 comprises a piston guide part 410, an oil inlet part 420, an oil supplying line 430, a piston 440, and a line connecting member 450. The piston guide part 410 is projectedly formed on an inner surface of the clutch cover 110 or 310, which surface faces the multiple disc clutch member 160, to define an annular configuration. The piston guide part 410 has a pair of piston guide grooves 412. The oil inlet part 420 is projectedly formed on an outer surface of the clutch cover 110 or 310 to define a ring-shaped configuration and has an oil groove 422 which is defined on a distal end surface of the oil inlet part 420. The oil supplying line 430 is formed in a manner such that the oil supplying line 430 extends between the oil groove 422 of the oil inlet part 420 and a distal end of the piston rod guide part 410. The piston 440 is brought into contact with the multiple disc clutch member 160 by a pressure of oil which is supplied through the oil supplying line 430. The piston 440 has a body which takes a U-shaped cross-section and a spring supporting projection 442 against which an end of the annular leaf spring 400*a* is supported. The line connecting member 450 is coupled to the oil inlet part 420 and fixedly maintained in a manner such that the clutch cover 110 or 310 can be freely rotated with respect to the line connecting member 450. The line connecting member 450 has a connector 452 which is formed with an oil hole 454 which in turn is communicated with the oil groove 422 of the oil inlet part 420.

A circumferential inner surface of the piston 440 and opposite surfaces of the line connecting member 450 and the oil inlet part 420 which are brought into sliding contact with each other, are defined with circumferential grooves into which leakage preventing members such as O-rings 456 are fitted for preventing oil from leaking.

While not shown in the drawings, the hydraulic device 400 is provided with additional parts including a pipeline which is connected with the connector 452, a control valve which controls a flow direction and a pressure of oil supplied through the pipeline, an oil pump which supplies compressed oil, and so on. The additional parts can be modified into a variety of forms within the scope of the present invention.

A circumferential outer end of the cylindrical supporting boss 122 or 322 is formed with a spring supporting sleeve 122*b* or 322*b* against which the other end of the annular leaf spring 400*a* is fastened.

Hereinafter, operations of the car clutch according to the fourth embodiment of the present invention will be described in detail.

If an engine RPM is supplied as an operating signal to the hydraulic device 400 from an engine electronic control system, oil is supplied through the oil supplying line 430 to bias the piston 440 in the one direction toward the clutch base 120 or 320, and thereby external force is applied to the multiple disc clutch member 160, whereby the inner plates 162 and the outer plates 164 are tightly engaged one with another. By this, through the same operations as described in association with the first embodiment or the second embodiment of the present invention, the rotating force of the flywheel 40 is precisely transferred to the driven shaft 20. At this time, in the case that an engine RPM increases, the hydraulic device 400 presses the multiple disc clutch member 160 with elevated pressing force, thereby to accomplish a high power transfer efficiency.

On the other hand, if an engine RPM decreases, the annular leaf spring 400a forces the spring supporting projection 442 to move in the other direction toward the clutch cover 110 or 310 by its own elastic force. Due to this, as the oil which is compressively supplied into the piston 440, is drained, a magnitude of pressing force which is applied to the multiple disc clutch member 160 is reduced. Therefore, power transfer to the automatic transmission can be properly effected.

INDUSTRIAL APPLICABILITY

As a result, the clutch apparatus for an automatic transmission according to the present invention provides advantages in that, since the clutch apparatus transfers engine power to the automatic transmission using a mechanical arrangement including planetary gears and the like rather than using fluid, power loss due to fluid friction is not caused, whereby a power transfer efficiency is increased, passing and acceleration capability of a motor vehicle is improved, and a maximum speed is raised.

Moreover, due to the fact that the clutch apparatus transfers engine power to the automatic transmission using the mechanical arrangement, a complicated hydraulic mechanism and a cooling apparatus are not needed, by which a simple construction is achieved. Consequently, manufacturing cost is reduced and productivity is increased.

Furthermore, because force of a driven side of the motor vehicle can be transferred to a driving side of the motor vehicle along a reverse direction, an engine brake operation can be fulfilled, by which safe driving of the motor vehicle is ensured. In addition, due to the fact that an engine of the motor vehicle can be started by pushing the motor vehicle, it is possible to cope with an emergency situation such as discharge of a battery.

What is claimed is:

1. A clutch apparatus for an automatic transmission, which is arranged at an input end of the automatic transmission to connect and disconnect engine power flow to the automatic transmission and to transfer multiplied torque to the automatic transmission, the clutch apparatus comprising:
    a clutch base mounted to a flywheel of an engine and having a supporting boss which possesses a cylindrical configuration and is projectedly formed on an inner surface of the clutch base, the supporting boss having first spline grooves which are defined on a circumferential inner surface of the supporting boss;
    a clutch cover coupled to a circumferential outer portion of the clutch base and possessing a cylindrical configuration which is opened at one end in a manner such that a space is defined in the clutch cover, the clutch cover being formed, at a center portion of a closed surface thereof, with a center hole through which a driven shaft connected to the automatic transmission is inserted;
    an output shaft rotatably fitted at one end thereof through the clutch base and at the other end thereof through the center hole of the clutch cover, and having a sun gear which is formed on a circumferential outer surface of the output shaft and second spline grooves which are defined on a circumferential inner surface of the output shaft;
    a pair of one-way rotating bearings fitted around both ends of the output shaft, respectively, in a manner such that the output shaft can be rotated in one direction which is the same as a rotating direction of the flywheel and cannot be rotated in the other direction which is opposite to the rotating direction of the flywheel;
    a plurality of planetary gear sections each possessing a guide shaft and a planetary gear, the guide shaft having one end which is rotatably fitted through the clutch base and the other end which is rotatably supported by the clutch cover, the planetary gear being formed on a circumferential outer surface of the guide shaft and being meshed with the sun gear of the output shaft;
    a rotating member having an internal ring gear and third spline grooves, the internal ring gear being formed on a circumferential inner surface of the rotating member and being meshed with planetary gears of the plurality of planetary gear sections, the third spline grooves being defined on a circumferential outer surface of the rotating member;
    a multiple disc clutch member having a plurality of inner plates which are fitted around the rotating member and a plurality of outer plates which are fitted into the supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the supporting boss;
    a pressing plate disposed between the multiple disc clutch member and the clutch cover, the pressing plate being moved by pressing force which is applied thereto in a manner such that the inner plates and the outer plates are tightly engaged one with another and thereby are locked one to another, the pressing plate possessing an annular plate-shaped configuration;
    pressing means arranged between the pressing plate and the clutch cover for applying pressing force to the pressing plate; and
    pressing force adjusting means arranged in a circumferential space which is defined between circumferential outer portions of the clutch base and the clutch cover, in a manner such that each pressing force adjusting means is capable of pivoting movement for changing an axial position of the pressing plate and adjusting a magnitude of pressing force which is applied to the multiple disc clutch member, depending upon a magnitude of centrifugal force generated by rotating force which is transferred from the flywheel.

2. The clutch apparatus as claimed in claim 1, wherein the pressing means comprises a plurality of first magnets which are disposed on an outer surface of the pressing plate to define a circular arrangement, and a plurality of second magnets which are disposed on an inner surface of the clutch cover in a manner such that the second magnets are opposite to the first magnets, respectively, the first and second magnets having the same polarity to create repulsive force therebetween.

3. The clutch apparatus as claimed in claim 1, wherein the pressing means comprises a plurality of coil springs having one ends which are fastened to an outer surface of the pressing plate and the other ends which are fastened to an inner surface of the clutch cover.

4. The clutch apparatus as claimed in claim 1, wherein the pressing means comprises a hydraulic device which is disposed in the clutch cover and controlled by a control unit controlling engine output, and an annular leaf spring is installed on the supporting boss of the clutch base to exert elastic pressing force on the hydraulic device thereby to remove external force which is applied to the multiple disc clutch member by the hydraulic device.

5. The clutch apparatus as claimed in claim 1, wherein each pressing force adjusting means comprises:

a support bar fastened at both ends thereof to the clutch base and the clutch cover, respectively, in a manner such that the support bar is arranged in the circumferential space which is defined between circumferential outer portions of the clutch base and the clutch cover and the pressing plate is fitted around the support bar to be capable of being moved in an axial direction, the support bar having an externally threaded portion which is formed on a circumferential outer surface and at a middle portion of the support bar;

a balancing weight having one end which is fitted around the support bar, to be pivotally rotated about the one end;

a compression spring fitted around the support bar for applying elastic force to the balancing weight;

a bearing-supporting ring fitted around the support bar in a manner such that the bearing-supporting ring is brought into contact with an end of the compression spring;

a pair of guide bearings fitted around the support bar and located at both sides, respectively, of the one end of the balancing weight, to smooth pivotal rotation of the balancing weight; and an elastic member having one end which is secured to the other end of the balancing weight and the other end which is secured to the inner surface of the clutch cover, so that the elastic member can return the balancing weight which is pivotally rotated by the centrifugal force, to its original position.

6. The clutch apparatus as claimed in claim 4, wherein the hydraulic device comprises:

a piston guide part projectedly formed on an inner surface of the clutch cover, which surface faces the multiple disc clutch member, to define an annular configuration, the piston guide part having a pair of piston guide grooves;

an oil inlet part projectedly formed on an outer surface of the clutch cover to define a ring-shaped configuration and having an oil groove which is defined on a distal end surface of the oil inlet part;

an oil supplying line formed in a manner such that the oil supplying line extends between the oil groove of the oil inlet part and a distal end of the piston rod guide part;

a piston brought into contact with the multiple disc clutch member by a pressure of oil which is supplied through the oil supplying line, the piston having a body which takes a U-shaped cross-section and a spring supporting projection against which an end of the annular leaf spring is supported; and a line connecting member coupled to the oil inlet part and fixedly maintained in a manner such that the clutch cover can be freely rotated with respect to the line connecting member, the line connecting member having a connector which is formed with an oil hole which in turn is communicated with the oil groove of the oil inlet part.

7. A clutch apparatus for an automatic transmission, which is arranged at an input end of the automatic transmission to connect and disconnect engine power flow to the automatic transmission and to transfer multiplied torque to the automatic transmission, the clutch apparatus comprising:

a clutch base mounted to a flywheel of an engine and having a supporting boss and a ring gear boss which are projectedly formed on an inner surface of the clutch base in a manner such that the ring gear boss is placed inward of the supporting boss, the supporting boss having first spline grooves which are defined on a circumferential inner surface of the supporting boss, the ring gear boss having a first internal ring gear which is formed on a circumferential inner surface of the ring gear boss;

a clutch cover coupled to a circumferential outer portion of the clutch base and having a cylindrical configuration which is opened at one end in a manner such that a space is defined in the clutch cover, the clutch cover being formed, at a center portion of a closed surface thereof, with a center hole through which a driven shaft connected to the automatic transmission is inserted;

an output shaft rotatably fitted at one end thereof through the clutch base and at the other end thereof through the center hole of the clutch cover, and having a sun gear which is formed on a circumferential outer surface of the output shaft and second spline grooves which are defined on a circumferential inner surface of the output shaft;

a pair of one-way rotating bearings fitted around both ends of the output shaft, respectively, in a manner such that the output shaft can be rotated in one direction which is the same as a rotating direction of the flywheel and cannot be rotated in the other direction which is opposite to the rotating direction of the flywheel;

a carrier having a first disc and a second disc which are coupled with each other by means of a plurality of connecting members in a manner such that the first disc and the second disc are spaced apart from each other by a predetermined distance, the first disc being rotatably brought into contact at one surface thereof with the inner surface of the clutch base by the medium of a first thrust bearing, the second disc being rotatably brought into contact with the clutch cover by the medium of a second thrust bearing;

a plurality of double planetary gear sections fitted around the plurality of connecting members, respectively, in such a way as to be disposed in the carrier, and each having integrally formed thereon a first planetary gear and a second planetary gear which have different numbers of teeth or different modules, the first planetary gear being meshed with the first internal ring gear, the second planetary gear being meshed with the sun gear of the output shaft;

a rotating member possessing a ring-shaped configuration and having a second internal ring gear and third spline grooves, the second internal ring gear being formed on a circumferential inner surface of the rotating member and being meshed with second planetary gears of the plurality of double planetary gear sections, the third spline grooves being defined on a circumferential outer surface of the rotating member, the second and first internal ring gears having different numbers of teeth or different modules;

a multiple disc clutch member having a plurality of inner plates which are fitted around the rotating member and a plurality of outer plates which are fitted into the supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the supporting boss;

a pressing plate disposed between the multiple disc clutch member and the clutch cover, the pressing plate being moved by pressing force which is applied thereto in a manner such that the inner plates and the outer plates are tightly engaged one with another and thereby are locked one to another, the pressing plate possessing an annular plate-shaped configuration;

pressing means arranged between the pressing plate and the clutch cover for applying pressing force to the pressing plate; and pressing force adjusting means arranged in a circumferential space which is defined between circumferential outer portions of the clutch base and the clutch cover, in a manner such that each pressing force adjusting means is capable of pivoting movement for changing an axial position of the pressing plate and adjusting a magnitude of pressing force which is applied to the multiple disc clutch member, depending upon a magnitude of centrifugal force generated by rotating force which is transferred from the flywheel.

* * * * *